(12) United States Patent
Kwon et al.

(10) Patent No.: US 10,309,494 B2
(45) Date of Patent: Jun. 4, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Hyun Sik Kwon, Seoul (KR); Seongwook Ji, Gunpo-si (KR); Ki Tae Kim, Incheon (KR); Juhyeon Park, Suwon-si (KR); Ilhan Yoo, Seongnam-si (KR); Seong Wook Hwang, Gunpo-si (KR); Wonmin Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/828,336

(22) Filed: Nov. 30, 2017

(65) Prior Publication Data
US 2019/0078656 A1   Mar. 14, 2019

(30) Foreign Application Priority Data
Sep. 12, 2017  (KR) .......... 10-2017-0116711

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ............. F16H 2200/2046–2200/2061; F16H 2200/2012–2200/2017
See application file for complete search history.

(56) References Cited

U.S. PATENT DOCUMENTS

| 4,038,888 | A | * | 8/1977 | Murakami | F16H 3/666 475/276 |
| 8,870,705 | B2 | * | 10/2014 | Diemer | F16H 3/66 475/276 |
| 9,163,705 | B1 | * | 10/2015 | Hwang | F16H 3/666 |
| 9,587,718 | B1 | * | 3/2017 | Kim | F16H 3/666 |
| 9,933,048 | B1 | * | 4/2018 | Kim | F16H 3/66 |

(Continued)

*Primary Examiner* — Charles A Fox
*Assistant Examiner* — Lillian T Nguyen
(74) *Attorney, Agent, or Firm* — McDonnell Boehnen Hulbert & Berghoff LLP

(57) ABSTRACT

A planetary gear train includes input and output shafts; first to fourth planetary gear sets respectively having first to third, fourth to sixth, seventh to ninth, and tenth to twelfth elements, respectively; a first shaft connected with the second and twelfth elements, and selectively connected with the input shaft, a second shaft connected with the sixth element, and selectively connected with the input shaft, a third shaft connected with the eighth element and the output shaft, a fourth shaft connected with the first, fourth, and tenth elements, a fifth shaft connected with the third, fifth, and ninth element, at least one additional shaft selectively connecting a corresponding element to a transmission housing, wherein the corresponding element is an element of the first or second planetary gear sets that is not interconnected.

11 Claims, 2 Drawing Sheets

(56) References Cited

U.S. PATENT DOCUMENTS

2012/0270694 A1* 10/2012 Seo .......................... F16H 3/66
                                                           475/276
2015/0111690 A1*  4/2015 Shim ........................ F16H 3/66
                                                           475/280
2017/0268625 A1*  9/2017 Kook ........................ F16H 3/66

* cited by examiner

FIG. 2

| Shift-stage | Engagement element | | | | | | Gear ratio |
|---|---|---|---|---|---|---|---|
| | C1 | C2 | C3 | C4 | B1 | B2 | |
| D1 | | ● | ● | | | ● | 5.088 |
| D2 | | ● | | | ● | ● | 3.484 |
| D3 | | ● | ● | | ● | | 2.538 |
| D4 | | ● | | ● | ● | | 1.705 |
| D5 | ● | ● | | | ● | | 1.385 |
| D6 | ● | | | ● | ● | | 1.252 |
| D7 | ● | | ● | ● | | | 1.000 |
| D8 | ● | | ● | | ● | | 0.907 |
| D9 | ● | | ● | | | ● | 0.753 |
| D10 | ● | | | | ● | ● | 0.516 |
| REV | | ● | | ● | | ● | -3.070 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0116711 filed in the Korean Intellectual Property Office on Sep. 12, 2017, the entire contents of which are incorporated herein by reference.

BACKGROUND (a) Technical Field

The present disclosure relates to an automatic transmission for a vehicle.

(b) Description of the Related Art

Recently, increasing oil prices have triggered stiff competition in enhancing vehicle fuel consumption. Research on achieving more shift-stages for an automatic transmission has been undertaken to enhance fuel consumption and drivability.

In particular, to simultaneously provide better drivability and enhanced fuel consumption by achieving more engine shift stages engine, research has been undertaken to reduce engine and to enhance fuel consumption by so-called downsizing of an automatic transmission.

Previously, to achieve more shift stages for an automatic transmission, the number of parts has typically been increased, thereby reducing the ease of installation, increasing production cost, increasing weight and/or decreasing power flow efficiency.

Therefore, in order to maximally enhance fuel consumption of an automatic transmission vehicle having more shift stages, it is important for better efficiency to be achieved using a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven engagement elements (frictional elements), and may easily become lengthy, thereby reducing ease of installation.

Therefore, disposing planetary gear sets in parallel or employing dog clutches instead of wet-type control elements has been attempted. However, such an arrangement may not be widely applicable, and using dog clutches may easily deteriorate shift-feel.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure relates to a planetary gear train for an automatic transmission vehicle enabling at least ten forward speeds, thereby providing better performance and fuel efficiency of a vehicle.

A planetary gear train according to an example embodiment includes an input shaft for receiving an engine torque; an output shaft for outputting a shifted torque; a first planetary gear set having first, second, and third rotational elements; a second planetary gear set having fourth, fifth, and sixth rotational elements; a third planetary gear set having seventh, eighth, and ninth rotational elements; and a fourth planetary gear set having tenth, eleventh, and twelfth rotational elements. An example planetary gear train may further include a first shaft fixedly connected with the second rotational element and the twelfth rotational element, and selectively connected with the input shaft, a second shaft fixedly connected with the sixth rotational element, and selectively connected with the input shaft, a third shaft fixedly connected with the eighth rotational element and fixedly connected with the output shaft, a fourth shaft fixedly connected with the first rotational element, the fourth rotational element, and the tenth rotational element, a fifth shaft fixedly connected with the third rotational element, the fifth rotational element, and the ninth rotational element, and at least one additional shaft each selectively connecting a corresponding element to the transmission housing, the corresponding element being a rotational element of the third and fourth planetary gear sets that is not fixedly interconnected.

The at least one additional shaft may include a sixth shaft fixedly connected with the seventh rotational element and selectively connected with the transmission housing, and a seventh shaft fixedly connected with the eleventh rotational element and selectively connected with the transmission housing. The input shaft and the first shaft, the input shaft and the second shaft, the third shaft and the fourth shaft, and the fourth shaft and the sixth shaft may be selectively interconnected with each other respectively.

The example planetary gear train may further include four clutches each selectively connecting a corresponding pair among the input shaft, the output shaft, and the first to seventh shafts, and two brakes selectively connecting the sixth shaft and the seventh shaft to the transmission housing respectively.

In an example embodiment, the four clutches may include a first clutch arranged between the input shaft and the first shaft, a second clutch arranged between the input shaft and the second shaft, a third clutch arranged between the fourth shaft and the sixth shaft, and a fourth clutch arranged between the third shaft and the fourth shaft. In an example embodiment, the two brakes may include a first brake arranged between the sixth shaft and the transmission housing, and a second brake arranged between the seventh shaft and the transmission housing.

In an example embodiment, the first planetary gear set may be a single pinion planetary gear set having a first sun gear, a first planet carrier, and a first ring gear as the first, second, and third rotational elements. The second planetary gear set may be a single pinion planetary gear set having a second sun gear, a second planet carrier, and a second ring gear as the fourth, fifth, and sixth rotational elements. The third planetary gear set may be a single pinion planetary gear set having a third sun gear, a third planet carrier, and a third ring gear as the seventh, eighth, and ninth rotational elements. The fourth planetary gear set may be a single pinion planetary gear set having a fourth sun gear, a fourth planet carrier, and a fourth ring gear as the tenth, eleventh, and twelfth rotational elements.

The first, second, third, and fourth planetary gear sets may be arranged in the order of the second, first, fourth, and third planetary gear sets from an engine side.

A planetary gear train according to an example embodiment of the present invention may realize at least ten forward speeds and one reverse speed by combination of four planetary gear sets together with six engagement elements.

In addition, a planetary gear train according to an example embodiment of the present invention may substantially improve driving stability by realizing shift-stages appropriate for the rotation speed of an engine arising from the multi-stages of an automatic transmission.

In addition, a planetary gear train according to an example embodiment of the present invention may maximize engine driving efficiency in a multi-stage automatic transmission, and may improve power delivery performance and fuel consumption.

Furthermore, effects that can be obtained or expected from example embodiments of the present invention are directly or suggestively described in the following detailed description. That is, various effects expected from example embodiments of the present invention will be described in the following detailed description.

BRIEF DESCRIPTION OF THE DRAWINGS

FIG. 2 is an operational chart for respective control elements at respective shift-stages applicable to a planetary gear train according to an example embodiment of the present invention.

DETAILED DESCRIPTION OF THE EMBODIMENTS

Figure 1:
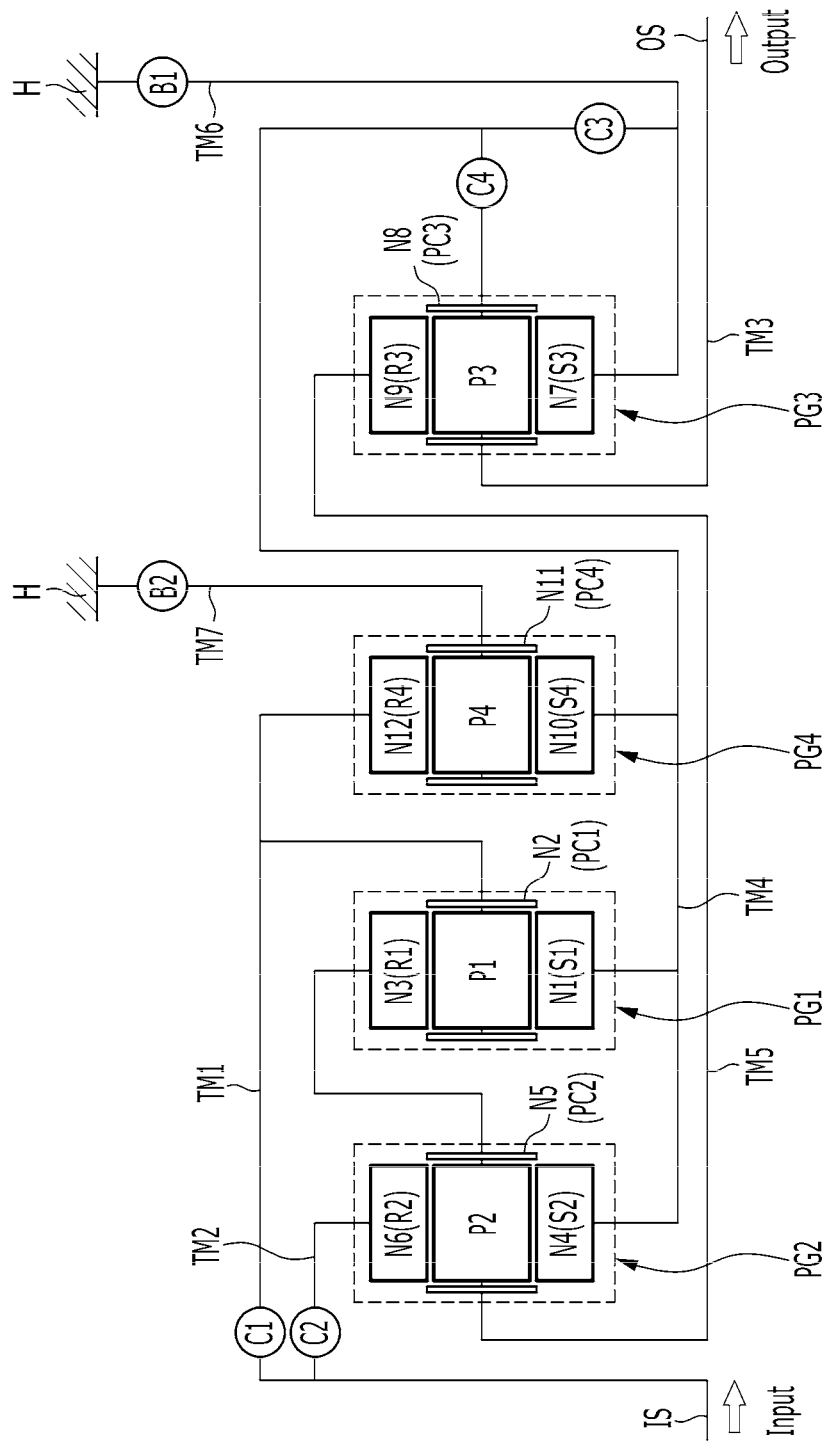
FIG. 1 is a schematic diagram of a planetary gear train according to an example embodiment of the present invention.

Hereinafter, an example embodiment of the present invention will be described in detail with reference to drawings.

The drawings and description are to be regarded as illustrative in nature and not restrictive, and like reference numerals designate like elements throughout the specification.

FIG. 1 is a schematic diagram of a planetary gear train according to an example embodiment of the present invention.

Referring to FIG. 1, a planetary gear train according to an example embodiment of the present invention includes first, second, third, and fourth planetary gear sets PG1, PG2, PG3, and PG4 arranged along the same axis, an input shaft IS, an output shaft OS, seven shafts TM1 to TM7 interconnecting rotational elements of first, second, third, and fourth planetary gear sets PG1, PG2, PG3, and PG4, engagement elements of four clutches C1 to C4, two brakes B1 and B2, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of the second, the first, and the fourth, and the third planetary gear sets PG2, PG1, PG4, and PG3, beginning from the engine side.

Input shaft IS is an input member and may receive torque from a crankshaft of an engine through a torque converter.

Output shaft OS is an output member arranged along the same axis as input shaft IS, and outputs a shifted driving torque to a driveshaft through a differential apparatus.

In the example embodiment of FIG. 1, first planetary gear set PG1 is a single pinion planetary gear set, and includes a first sun gear S1, a first planet carrier PC1 rotatably supporting a plurality of first pinion gears P1 externally gear-meshed with first sun gear S1, and a first ring gear R1 internally gear-meshed with the plurality of first pinion gears P1 engaged with first sun gear S1. First sun gear S1 acts as a first rotational element N1, first planet carrier PC1 acts as a second rotational element N2, and first ring gear R1 acts as a third rotational element N3.

In the example embodiment of FIG. 1, second planetary gear set PG2 is a single pinion planetary gear set, and includes a second sun gear S2, a second planet carrier PC2 rotatably supporting a plurality of second pinion gears P2 externally gear-meshed with second sun gear S2, and a second ring gear R2 internally gear-meshed with the plurality of second pinion gears P2 engaged with second sun gear S2. Second sun gear S2 acts as a fourth rotational element N4, second planet carrier PC2 acts as a fifth rotational element N5, and second ring gear R2 acts as a sixth rotational element N6.

In the example embodiment of FIG. 1, third planetary gear set PG3 is a single pinion planetary gear set, and includes a third sun gear S3, a third planet carrier PC3 rotatably supporting a plurality of third pinion gears P3 externally gear-meshed with third sun gear S3, and a third ring gear R3 internally gear-meshed with the plurality of third pinion gears P3 engaged with third sun gear S3. Third sun gear S3 acts as a seventh rotational element N7, third planet carrier PC3 acts as an eighth rotational element N8, and third ring gear R3 acts as a ninth rotational element N9.

In the example embodiment of FIG. 1, fourth planetary gear set PG4 is a single pinion planetary gear set, and includes a fourth sun gear S4, a fourth planet carrier PC4 rotatably supporting a plurality of fourth pinion gears P4 externally gear-meshed with fourth sun gear S4, and a fourth ring gear R4 internally gear-meshed with the plurality of fourth pinion gears P4 engaged with fourth sun gear S4. Fourth sun gear S4 acts as a tenth rotational element N10, fourth planet carrier PC4 acts as an eleventh rotational element N11, and fourth ring gear R4 acts as a twelfth rotational element N12.

In the first, second, third, and fourth planetary gear sets PG1, PG2, PG3, and PG4, first rotational element N1 is fixedly connected with fourth rotational element N4 and tenth rotational element N10, the, second rotational element N2 is fixedly connected with twelfth rotational element N12, third rotational element N3 is fixedly connected with fifth rotational element N5 and the ninth rotational element N9, and seven shafts TM1 to TM7 are formed.

The seven shafts TM1 to TM7 are hereinafter described in detail.

First shaft TM1 is fixedly connected with second rotational element N2 (first planet carrier PC1) and twelfth rotational element N12 (fourth ring gear R4), and selectively connected with input shaft IS thereby selectively acting as an input element.

Second shaft TM2 is fixedly connected with sixth rotational element N6 (second ring gear R2), and selectively connected with input shaft IS thereby selectively acting as an input element.

Third shaft TM3 is fixedly connected with eighth rotational element N8 (third planet carrier PC3), and fixedly connected with output shaft OS thereby always acting as an output element.

Fourth shaft TM4 is fixedly connected with first rotational element N1 (first sun gear S1), fourth rotational element N4 (second sun gear S2), and tenth rotational element N10 (fourth sun gear S4).

Fifth shaft TM5 is fixedly connected with third rotational element N3 (first ring gear R1), fifth rotational element N5 (second planet carrier PC2), and ninth rotational element N9 (third ring gear R3).

Sixth shaft TM6 is fixedly connected with seventh rotational element N7 (third sun gear S3).

Seventh shaft TM7 is fixedly connected with eleventh rotational element N11 (fourth planet carrier PC4).

Each of the seven shafts TM1 to TM7 may be (1) a rotational member that fixedly interconnects the input and output shafts and rotational elements of the planetary gear sets PG1, PG2, PG3, and PG4, (2) a rotational member that selectively interconnects a rotational element to the transmission housing H, or (3) a fixed member fixed to the transmission housing H.

In the disclosure, when two or more members are described as "fixedly connected", where the member may be any of a shaft, an input shaft, an output shaft, a rotational member, and a transmission housing, it means that the fixedly connected members always rotate at a same speed.

When two or more members are described as "selectively connected" by an engagement element, it means that the selectively connected members rotate separately when the engagement element is not engaged, and rotate at the same speed when the engagement element is engaged. It should be understood that when a member is "selectively connected" with a transmission housing by an engagement element, the member may be stationary when the engagement element is engaged.

First shaft TM1 is selectively connected with input shaft IS, second shaft TM2 is selectively connected with input shaft IS, third shaft TM3 is selectively connected with fourth shaft TM4, and the fourth shaft TM4 is selectively connected with sixth shaft TM6.

Sixth shaft TM6 and seventh shaft TM7 are selectively connected with transmission housing H, thereby selectively acting as fixed elements respectively.

The engagement elements of four clutches C1, C2, C3, and C4 are arranged between the seven shafts TM1 to TM7, the, input shaft IS, and output shaft OS, so as to form selective connections.

The seven shafts TM1 to TM7 may be selectively connected with transmission housing H by control elements of two brakes B1 and B2.

The six engagement elements of the four clutches C1 to C4 and the two brakes B1 and B2 are arranged as follows.

First clutch C1 is arranged between and selectively connects input shaft IS and first shaft TM1, thereby controlling power delivery therebetween.

Second clutch C2 is arranged between and selectively connects input shaft IS and second shaft TM2, thereby controlling power delivery therebetween.

Third clutch C3 is arranged between and selectively connect fourth shaft TM4 and sixth shaft TM6 thereby controlling power delivery therebetween.

Fourth clutch C4 is arranged between and selectively connect third shaft TM3 and fourth shaft TM4, thereby controlling power delivery therebetween.

First brake B1 is arranged between and selectively connects sixth shaft TM6 and transmission housing H.

Second brake B2 is arranged between and selectively connects the seventh shaft TM7 and the transmission housing H.

In an example embodiment, the engagement elements of first, second, third, and fourth clutches C1, C2, C3, and C4 and first and second brakes B1 and B2 may be multi-plate hydraulic pressure friction devices that are frictionally engaged by hydraulic pressure. However, these engagement elements are not limited to such a configuration, as various other configurations that are electrically-controllable may be available.

FIG. 2 is an operational chart for respective control elements at respective shift-stages applicable to a planetary gear train according to an example embodiment of the present disclosure.

Referring to FIG. 2, a planetary gear train according to an example embodiment of the present disclosure achieves shifting between ten forward speeds and one reverse speed by operating four elements among the engagement element of first, second, third, and fourth clutches C1, C2, C3, and C4 and first and second brakes B1 and B2.

In the forward first speed D1, second and third clutches C2 and C3 and second brake B2 are simultaneously operated. As a result, e second shaft TM2 is connected with input shaft IS by the operation of second clutch C2, and fourth shaft TM4 is connected with sixth shaft TM6 by the operation of third clutch C3. In this configuration, torque is input to second shaft TM2.

In addition, seventh shaft TM7 acts as a fixed element by the operation of second brake B2, thereby achieving forward first speed D1 and outputting a shifted torque to output shaft OS connected with third shaft TM3.

In the forward second speed D2, second clutch C2 and first and second brakes B1 and B2 are simultaneously operated. As a result, second shaft TM2 is connected with input shaft IS by the operation of second clutch C2. In this configuration, the input torque is input to second shaft TM2.

In this configuration, sixth and seventh shafts TM6 and TM7 act as fixed elements by the operation of first and second brakes B1 and B2, thereby achieving the forward second speed D2 and outputting a shifted torque to output shaft OS connected with third shaft TM3.

In the forward third speed D3, second and third clutches C2 and C3 and first brake B1 are simultaneously operated. As a result, second shaft TM2 is connected with input shaft IS by the operation of second clutch C2, and fourth shaft TM4 is connected with sixth shaft TM6 by the operation of third clutch C3. In this configuration, torque is input to second shaft TM2.

In addition, sixth shaft TM6 acts as a fixed element by the operation of first brake B1, thereby achieving forward third speed D3 and outputting a shifted torque to output shaft OS connected with third shaft TM3.

In forward fourth speed D4, second and fourth clutches C2 and C4 and first brake B1 are simultaneously operated. As a result, second shaft TM2 is connected with input shaft IS by the operation of second clutch C2, and third shaft TM3 is connected with fourth shaft TM4 by the operation of fourth clutch C4. In this configuration, a torque is input to second shaft TM2.

In addition, sixth shaft TM6 acts as a fixed element by the operation of the first brake B1, thereby achieving forward fourth speed D4 and outputting a shifted torque to output shaft OS connected with third shaft TM3.

In the forward fifth speed D5, first and second clutch C1 and C2 and first brake B1 are simultaneously operated. As a result, first shaft TM1 is connected with input shaft IS by the operation of first clutch C1, and first shaft TM1 is connected with input shaft IS by the operation of first clutch C1. In this configuration, a torque is input to first shaft TM1 and second shaft TM2.

In addition, sixth shaft TM6 acts as a fixed element by the operation of the first brake B1, thereby achieving forward fifth speed D5 and outputting a shifted torque to output shaft OS connected with third shaft TM3 In the forward sixth speed D6, first and fourth clutches C1 and C4 and first brake B1 are simultaneously operated. As a result, first shaft TM1 is connected with input shaft IS by the operation of first clutch C1, and third shaft TM3 is connected with fourth shaft TM4 by the operation of fourth clutch C4. In this configuration, an input torque is input to first shaft TM1.

In addition, sixth shaft TM6 acts as a fixed element by the operation of first brake B1, thereby achieving forward sixth speed D6 and outputting a shifted torque to output shaft OS connected with third shaft TM3.

In the forward seventh speed D7, first, third, and fourth clutches C1, C3, and C4 are simultaneously operated. As a result, first shaft TM1 is connected with input shaft IS by the operation of first clutch C1, fourth shaft TM4 is connected with sixth shaft TM6 by the operation of third clutch C3, and third shaft TM3 is fixedly connected with fourth shaft TM4 by the operation of fourth clutch C4.

Then, the first, second, third, and fourth planetary gear sets PG1, PG2, PG3, and PG4 integrally rotate, and a torque is input to first shaft TM1, thereby achieving forward seventh speed D7 where a torque is output as inputted, and outputting a shifted torque to output shaft OS connected with third shaft TM3.

In the forward eighth speed D8, first and third clutches C1 and C3 and the first brake B1 are simultaneously operated. As a result, first shaft TM1 is connected with input shaft IS by the operation of first clutch C1, and fourth shaft TM4 is connected with sixth shaft TM6 by the operation of third clutch C3. In this configuration, an input torque is input to first shaft TM1.

In addition, sixth shaft TM6 acts as a fixed element by the operation of the first brake B1, thereby achieving forward eighth speed D8 and outputting a shifted torque to output shaft OS connected with third shaft TM3.

In forward ninth speed D9, first and third clutches C1 and C3 and second brake B2 are simultaneously operated. As a result, first shaft TM1 is connected with input shaft IS by the operation of first clutch C1, and fourth shaft TM4 is connected with sixth shaft TM6 by the operation of third clutch C3. In this configuration, an input torque is input to first shaft TM1.

In addition, seventh shaft TM7 acts as a fixed element by the operation of second brake B2, thereby achieving forward ninth speed D9 and outputting a shifted torque to output shaft OS connected with third shaft TM3.

In the forward tenth speed D10, first clutch C1 and first and second brakes B1 and B2 are simultaneously operated. As a result, first shaft TM1 is connected with input shaft IS by the operation of first clutch C1. In this configuration, the input torque is input to first shaft TM1.

In this configuration, sixth and seventh shafts TM6 and TM7 act as fixed elements by the operation of first and second brakes B1 and B2, thereby achieving the forward tenth speed D10 and outputting a shifted torque to output shaft OS connected with third shaft TM3.

In the reverse speed REV, second and fourth clutches C2 and C4 and second brake B2 are simultaneously operated. As a result, second shaft TM2 is connected with input shaft IS by the operation of second clutch C2, and third shaft TM3 is connected with fourth shaft TM4 by the operation of fourth clutch C4. In this configuration, a torque is input to the second shaft TM2.

In addition, the seventh shaft TM7 acts as a fixed element by the operation of the second brake B2, thereby achieving reverse speed REV and outputting a shifted torque to output shaft OS connected with third shaft TM3.

As described above, a planetary gear train according to an example embodiment of the present invention may realize ten forward speeds and one reverse speed by operating the four planetary gear sets PG1, PG2, PG3, and PG4 by controlling the four clutches C1, C2, C3, and C4 and the two brakes B1 and B2.

In addition, a planetary gear train according to an example embodiment of the present disclosure may substantially improve driving stability by realizing shift-stages appropriate for the rotation speed of an automatic transmission engine having multi-stages.

In addition, a planetary gear train according to an example embodiment of the present disclosure may maximize engine driving efficiency of a multi-stage automatic transmission, and may improve power delivery performance and fuel consumption.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7: first, second, third, fourth, fifth, sixth, and seventh shafts

What is claimed is:
1. A planetary gear train of an automatic transmission for a vehicle, comprising:
 an input shaft for receiving an engine torque;
 an output shaft for outputting a shifted torque;
 a first planetary gear set having first, second, and third rotational elements;
 a second planetary gear set having fourth, fifth, and sixth rotational elements;
 a third planetary gear set having seventh, eighth, and ninth rotational elements;
 a fourth planetary gear set having tenth, eleventh, and twelfth rotational elements;
 a first shaft fixedly connected with the second rotational element and the twelfth rotational element, and selectively connected with the input shaft;
 a second shaft fixedly connected with the sixth rotational element, and selectively connected with the input shaft;
 a third shaft fixedly connected with the eighth rotational element, and fixedly connected with the output shaft;
 a fourth shaft fixedly connected with the first rotational element, the fourth rotational element, and the tenth rotational element;
 a fifth shaft fixedly connected with the third rotational element, the fifth rotational element, and the ninth rotational element; and
 at least one additional shaft each selectively connecting a corresponding element to the transmission housing, the corresponding element being a rotational element of the third and fourth planetary gear sets that is not fixedly interconnected.

2. The planetary gear train of claim 1, wherein the at least one additional shaft comprises:
   a sixth shaft fixedly connected with the seventh rotational element and selectively connected with the transmission housing; and
   a seventh shaft fixedly connected with the eleventh rotational element and selectively connected with the transmission housing,
   wherein the input shaft and the first shaft, the input shaft and the second shaft, the third shaft and the fourth shaft, and the fourth shaft and the sixth shaft are selectively interconnected with each other, respectively.

3. The planetary gear train of claim 2, further comprising:
   a plurality of clutches each selectively connecting a corresponding pair among the input shaft, the output shaft, and the first to seventh shafts; and
   a plurality of brakes selectively connecting the sixth shaft and the seventh shaft to the transmission housing respectively.

4. The planetary gear train of claim 3, wherein the plurality of clutches comprises:
   a first clutch arranged between the input shaft and the first shaft;
   a second clutch arranged between the input shaft and the second shaft;
   a third clutch arranged between the fourth shaft and the sixth shaft; and
   a fourth clutch arranged between the third shaft and the fourth shaft,
   and wherein the plurality of brakes comprises:
   a first brake arranged between the sixth shaft and the transmission housing; and
   a second brake arranged between the seventh shaft and the transmission housing.

5. The planetary gear train of claim 1, wherein:
   the first planetary gear set comprises a single pinion planetary gear set having a first sun gear, a first planet carrier, and a first ring gear as the first, second, and third rotational elements, respectively;
   the second planetary gear set comprises a single pinion planetary gear set having a second sun gear, a second planet carrier, and a second ring gear as the fourth, fifth, and sixth rotational elements, respectively;
   the third planetary gear set comprises a single pinion planetary gear set having a third sun gear, a third planet carrier, and a third ring gear as the seventh, eighth, and ninth rotational elements, respectively; and
   the fourth planetary gear set comprises a single pinion planetary gear set having a fourth sun gear, a fourth planet carrier, and a fourth ring gear as the tenth, eleventh, and twelfth rotational elements, respectively.

6. The planetary gear train of claim 1, wherein the first, second, third, and fourth planetary gear sets are arranged in the order of the second, first, fourth, and third planetary gear sets from an engine side.

7. A planetary gear train of an automatic transmission for a vehicle, comprising:
   an input shaft for receiving an engine torque;
   an output shaft for outputting a shifted torque;
   a first planetary gear set having first, second, and third rotational elements;
   a second planetary gear set having fourth, fifth, and sixth rotational elements;
   a third planetary gear set having seventh, eighth, and ninth rotational elements; and
   a fourth planetary gear set having tenth, eleventh, and twelfth rotational elements,
   wherein the first rotational element is fixedly connected with the fourth rotational element and the tenth rotational element,
   the second rotational element is fixedly connected with the twelfth rotational element, and selectively connected with the input shaft,
   the third rotational element is fixedly connected with the fifth rotational element and the ninth rotational element,
   the sixth rotational element is selectively connected with the input shaft,
   the seventh rotational element is selectively connected with the tenth rotational element and the transmission housing respectively,
   the eighth rotational element is selectively connected with the tenth rotational element, and fixedly connected with the output shaft, and
   the eleventh rotational element is selectively connected with the transmission housing.

8. The planetary gear train of claim 6, further comprising:
   a plurality of clutches each selectively connecting a corresponding pair among the input shaft, the output shaft, and the rotational elements; and
   a plurality of brakes selectively connecting the seventh rotational element and eleventh rotational element to the transmission housing respectively.

9. The planetary gear train of claim 8, wherein the plurality of clutches comprises:
   a first clutch arranged between the input shaft and the second rotational element;
   a second clutch arranged between the input shaft and the sixth rotational element;
   a third clutch arranged between the seventh rotational element and the tenth rotational element; and
   a fourth clutch arranged between the eighth rotational element and the tenth rotational element,
   and wherein the plurality of brakes comprises:
   a first brake arranged between the seventh rotational element and the transmission housing; and
   a second brake arranged between the eleventh rotational element and the transmission housing.

10. The planetary gear train of claim 7, wherein:
   the first planetary gear set comprises a single pinion planetary gear set having a first sun gear, a first planet carrier, and a first ring gear as the first, second, and third rotational elements, respectively;
   the second planetary gear set comprises a single pinion planetary gear set having a second sun gear, a second planet carrier, and a second ring gear as the fourth, fifth, and sixth rotational elements, respectively;
   the third planetary gear set comprises a single pinion planetary gear set having a third sun gear, a third planet carrier, and a third ring gear as the seventh, eighth, and ninth rotational elements, respectively; and
   the fourth planetary gear set comprises a single pinion planetary gear set having a fourth sun gear, a fourth planet carrier, and a fourth ring gear as the tenth, eleventh, and twelfth rotational elements, respectively.

11. The planetary gear train of claim 7, wherein the first, second, third, and fourth planetary gear sets are arranged in the order of the second, first, fourth, and third planetary gear sets from an engine side.

* * * * *